No. 796,900. PATENTED AUG. 8, 1905.
L. A. CULL.
NUT LOCK.
APPLICATION FILED APR. 21, 1905.
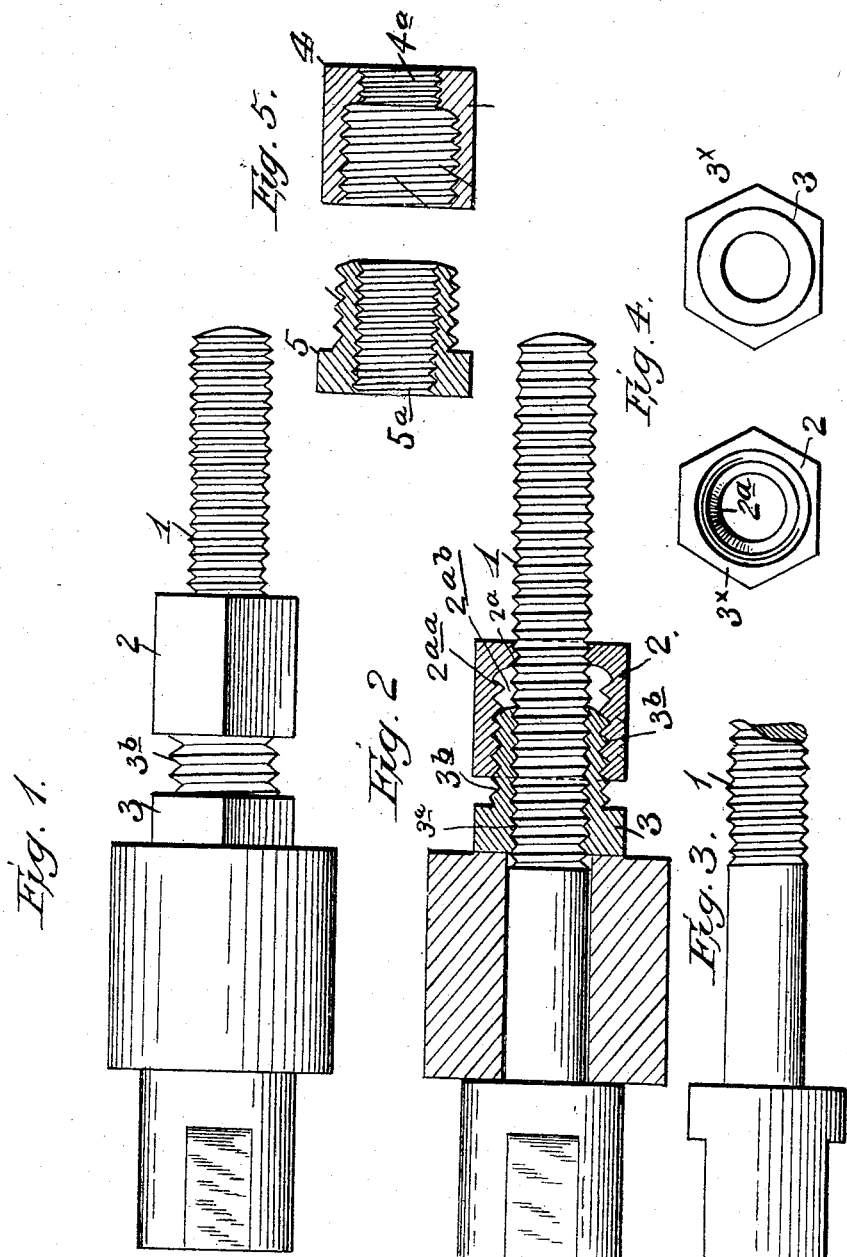
WITNESSES:
INVENTOR:
Louis A. Cull.

UNITED STATES PATENT OFFICE.

LOUIS ALBERT CULL, OF MARION, OHIO.

NUT-LOCK.

No. 796,900.     Specification of Letters Patent.     Patented Aug. 8, 1905.

Application filed April 21, 1905. Serial No. 256,719.

*To all whom it may concern:*

Be it known that I, LOUIS ALBERT CULL, a citizen of the United States, residing at Marion, in the county of Marion and State of Ohio, have invented new and useful Improvements in Nut-Locks, of which the following is a specification.

My invention relates to improvements in what may be termed "nut-locks."

Objects of the invention are to provide an absolutely effective locking action between the parts as against the possibility of the accidental or involuntary jarring off or working loose thereof and yet at any time permit of the ready removal of the parts without requiring the cutting of the bolt or the mutilating of any of the parts.

The invention is applicable for use upon railroads, automobiles, or elsewhere requiring the use of nuts and the locking of the same in place and avoids the use of cotter-pins, for instance, upon automobiles, where by the accidental and frequent displacement of such serious accidents are liable to occur.

To these ends said invention consists of certain structural features and combination and arrangement of parts, substantially as hereinafter fully disclosed and specifically pointed out.

In the accompanying drawings, illustrating the preferred embodiment of my invention, Figure 1 is a side view thereof. Fig. 4 is a longitudinal section of the same. Fig. 3 is a disassembled view of the bolt. Fig. 4 shows like views of the two interlocking or jam nuts. Fig. 5 shows also like views of two additional jam or interlocking nuts, which may be used interchangeably with the aforesaid jam-nuts.

In the carrying out of my invention I provide a suitably screw-threaded bolt 1, which may be of a certain standard or what is known as a "five-eighths eleven-thread standard" bolt. I also employ two nuts 2 and 3, which have a suitable exterior outline or contour, preferably as shown, for convenience in readily turning the same by the application thereto of a wrench, more especially at their effective or interlocking stage. Said nuts have in common an internal screw-thread $2^a$ and $3^a$, respectively, each adapted to effect engagement with the screw-threads of the bolt 1. The nut 2, however, has also an enlarged inner diameter $2^{ab}$, provided with a screw-thread $2^{aa}$ of different gage from that of its bolt-engaging screw-thread $2^a$, being preferably what is termed "ten and two-thirds standard" thread. The nut 3 in addition to its internal screw-thread has an external screw-thread $3^b$ of corresponding gage with and effective to engage the screw-thread $2^{aa}$ of the nut 2.

It is noted that the two nuts 2 and 3 being initially run upon the bolt 1 with the angular or manipulating portion $3^{\times}$ of the nut 3 presented toward and jammed tight against the object or part to be secured in place and through which the bolt is passed by suitably manipulating or turning the nut 2 into engagement with the outer threaded portion of the nut 3 a firm interlocking action between said nuts will result, providing for effectively securing the object in place. Also it is apparent that this interlocking action between the nuts is effected at any point along the bolt, whether the part or object has been jammed tightly in place or not, thus rendering the device effective for use where a cotter-pin or the like may be employed, as upon automobiles, while it is adapted for use in connection with railroads or other purpose where a nut-lock may be required.

In Fig. 5 the nuts (designated 4 and 5, respectively, corresponding to the nuts 2 and 3) are provided with screw-threads $4^a$ and $5^a$, respectively, having a gage of ten and four-fifths standard, answering to the screw-threads $2^{aa}$ and $3^b$ of the latter nuts, as also with screw-threads effecting engagement with the bolt. This different arrangement of screw-threads upon the nuts, it is apparent, is also effective for use for the purposes of my invention, thus providing for the employing of nuts irrespective of the particular gage of the interlocking threads thereof.

I claim—

1. A device of the character described, comprising a screw-threaded bolt, and superposed nuts having a common screw-threaded connection therewith, and additional interlocking screw-threads each of a greater pitch or gage than that of the gage of the bolt-thread, and of its own less-diametered screw-threaded surface.

2. A device of the character described, comprising a screw-threaded bolt, and superposed nuts having a common screw-threaded connection therewith and interlocking screw-threads each of a greater pitch or gage than that of its own less-diametered screw-threaded surface and of the bolt screw-thread, said screw-threads all running in a common direction.

3. A device of the character described, comprising a screw-threaded bolt, and superposed nuts, one nut having an extension provided with an inner screw-thread engaging said bolt screw-thread and with an outer screw-thread, and the other nut having different diameters, the greater diameter being equipped with a screw-thread engaging said outer screw-thread and the less diameter being equipped with a screw-thread engaging said bolt screw-thread, said outer screw-thread of one nut and the screw-thread of the greater diameter of the other nut being of a greater pitch or gage than that of the other screw-threads of said nuts, respectively, all of said screws running in a common direction.

4. A device of the character described, comprising a screw-threaded bolt and superposed nuts, one nut having an annular longitudinal extension provided with inner and outer screw-threads, said nut having its greater cross-sectional portion or enlargement presented next to the object for retention, and the other nut having a reduced diametered aperture provided with an internal screw-thread, and an enlarged chambered portion or extension also provided with an internal screw-thread, with its open end presented toward the greater cross-section or enlargement of the aforesaid nut, the screw-threads of the portions of said nuts engaging with each other being of a greater pitch or gage than that of the screw-threads thereof engaging the bolt, all of the screw-threads both of said bolt and said nuts running in the same or common direction.

In testimony whereof I affix my signature in presence of two subscribing witnesses.

LOUIS ALBERT CULL.

Witnesses:
FRED W. PETERS,
GEORGE D. COPELAND.